UNITED STATES PATENT OFFICE.

HERMAN BARNHARD, OF DAVENPORT, WASHINGTON.

BEVERAGE-PRODUCING MATERIAL AND PROCESS OF MAKING SAME.

1,150,733.  
Specification of Letters Patent.  
Patented Aug. 17, 1915.

No Drawing. Application filed March 27, 1914. Serial No. 827,597.

*To all whom it may concern:*

Be it known that I, HERMAN BARNHARD, a citizen of the United States, and a resident of Davenport, in the county of Lincoln and State of Washington, have invented a new and Improved Beverage-Producing Material and Process of Making Same, of which the following is a full, clear, and exact description.

The object of the invention is to provide a new and improved beverage-producing material which can be readily treated to yield an exceedingly healthful beverage of a desired strength to suit the taste of the user.

In trying to find a more healthful substitute for coffee I have discovered that the root of the vegetable genus *Daucus*, and more particularly that of the ordinary carrot (*Daucus carota*) when properly treated produces the desired result. For this purpose the carrot root is thoroughly washed and cleaned to remove all dirt or other extraneous matter, and then the carrot is cut up into thin slices. The slices are next dried and then roasted by the use of suitable apparatus and under the application of a slow fire until the slices reach a crisp condition and become brown in color. It is understood that by drying and roasting the slices the moisture originally contained in the carrot root is removed and the slices are converted into a hard, brown, roasted condition. The roasted material thus produced is reduced to powder form by grinding or other processes.

In order to make the beverage, the ground material is subjected to the action of boiling water and the resultant concoction is preferably strained to separate the grounds from the beverage. By using more or less of the beverage-producing material in a given quantity of water any desired strength may be given to the beverage to suit the taste of the user.

It is evident that the drying and washing of the slices may be carried on by any suitable means and the slices may be of any desired size and shape and hence I do not limit myself to any particular form of drying and washing means employed or the temperature necessary for producing the desired result, and I also do not limit myself to the shape of the slices as the same may be varied without departing from my invention, the essential nature of which is to provide a beverage-producing material from carrots.

In practice, the thin slices are dried in an oven for about twenty minutes under a heat of about 100° F. and are then roasted for ten minutes under a heat of about 145° F.

Having thus described my invention, I claim as new and desire to secure by Letters Patent:

1. A beverage producing material consisting of the dried and roasted roots of the vegetable *Daucus carota*, the said material being in the form of hard, thin, crisp, brown colored slices, free of extraneous matter and capable of being pulverized.

2. The process of producing a beverage material by first washing, then slicing the roots of the vegetable species *Daucus carota*, drying the slices for about twenty minutes at a temperature of approximately 100° F., roasting the dried product about ten minutes at a temperature of approximately 145° F. to free from moisture, and finally grinding to a powder.

3. The herein described process of producing a beverage material from the roots of the vegetable *Daucus carota*, which consists in first freeing the roots of extraneous matter by washing, then cutting the roots into thin slices, then subjecting the slices to a temperature sufficient to dehydrate and dry the same, then roasting the dehydrated slices at a temperature higher than the drying temperature to darken and render brittle said slices, then reducing the slices to a powder.

In testimony whereof I have signed my name to this specification in the presence of two subscribing witnesses.

HERMAN BARNHARD.

Witnesses:
R. E. ANDERSON,
ELIZABETH NELSON.